United States Patent
Ariki et al.

(10) Patent No.: US 12,247,837 B2
(45) Date of Patent: Mar. 11, 2025

(54) INFORMATION PROCESSING DEVICE AND INFORMATION PROCESSING METHOD

(71) Applicant: SONY CORPORATION, Tokyo (JP)

(72) Inventors: Yuka Ariki, Tokyo (JP); Takuya Narihira, Tokyo (JP)

(73) Assignee: SONY CORPORATION, Tokyo (JP)

( * ) Notice: Subject to any disclaimer, the term of this patent is extended or adjusted under 35 U.S.C. 154(b) by 699 days.

(21) Appl. No.: 16/973,138

(22) PCT Filed: Mar. 29, 2019

(86) PCT No.: PCT/JP2019/014090
§ 371 (c)(1),
(2) Date: Dec. 8, 2020

(87) PCT Pub. No.: WO2019/239680
PCT Pub. Date: Dec. 19, 2019

(65) Prior Publication Data
US 2021/0256371 A1   Aug. 19, 2021

(30) Foreign Application Priority Data
Jun. 15, 2018   (JP) .................................. 2018-114295

(51) Int. Cl.
*G06N 3/08*   (2023.01)
*G01C 21/34*   (2006.01)
(Continued)

(52) U.S. Cl.
CPC ............... *G01C 21/34* (2013.01); *G06N 3/08* (2013.01); *G06T 11/206* (2013.01);
(Continued)

(58) Field of Classification Search
CPC .......... G06N 3/08; G06N 3/0895; G06N 3/09; G06N 5/01; G06N 3/045; G06N 3/02;
(Continued)

(56) References Cited

U.S. PATENT DOCUMENTS 6,108,597 A     8/2000  Kirchner et al.
2019/0375103 A1* 12/2019  Cui .................. G06V 20/10
(Continued)

FOREIGN PATENT DOCUMENTS

CN   106873585 A  *  6/2017  ............ G05D 1/021
DE   69700544 T2     5/2000
(Continued)

OTHER PUBLICATIONS

Patel, "Introduction to A", Jun. 2016, https://www.redblobgames.com/pathfinding/a-star/introduction.html (Year: 2016).*

(Continued)

*Primary Examiner* — Li Wu Chang
(74) *Attorney, Agent, or Firm* — CHIP LAW GROUP

(57) ABSTRACT

To enable learning of versatile heuristics with a large reduction in search time. Provided is an information processing device including: a learning unit configured to learn a heuristics function according to path searching, with a convolutional neural network, in which the convolutional neural network carries out learning based on a plurality of obstacle maps, to output a heuristics map expressing the heuristics function as a two or more dimensional image. Moreover, provided is an information processing method including: learning a heuristics function according to path searching, by a processor, with a convolutional neural network, in which the convolutional neural network carries out learning based on a plurality of obstacle maps, to output a heuristics map expressing the heuristics function as a two or more dimensional image.

12 Claims, 12 Drawing Sheets

(51) Int. Cl.
*G06T 11/20* (2006.01)
*G06N 3/0895* (2023.01)
*G06N 3/09* (2023.01)
*G06N 5/01* (2023.01)

(52) U.S. Cl.
CPC .............. *G06N 3/0895* (2023.01); *G06N 3/09* (2023.01); *G06N 5/01* (2023.01)

(58) Field of Classification Search
CPC ..... G01C 21/34; G06T 11/206; G06T 11/203; B25J 13/00; G08G 1/16; G06V 20/42
See application file for complete search history.

(56) References Cited

U.S. PATENT DOCUMENTS

2020/0401151 A1* 12/2020 Liu ...................... G05D 1/0221
2021/0073449 A1* 3/2021 Segev ..................... G06F 30/27

FOREIGN PATENT DOCUMENTS

| EP | 4148391 | A1 | * | 3/2023 | ......... G01C 21/3415 |
| GB | 2578721 | A | * | 5/2020 | ............ B60W 30/10 |
| JP | 2000-020494 | A | | 1/2000 | |
| JP | 2017-058194 | A | | 3/2017 | |
| WO | 97/033212 | A1 | | 9/1997 | |

OTHER PUBLICATIONS

Chen, "A Navigation Routing Method, Robot, and System," CN 106873585 A Machine English Translation by Espacenet, https://worldwide.espacenet.com, pp. 1-28. (Year: 2023).*
Abiyev et al. "Robot Pathfinding Using Vision Based Obstacle Detection", IEEE, 2017, p. 6.*
Ran et al. "Convolutional Neural Network-Based Robot Navigation Using Uncalibrated Spherical Images", sensors, 2017, pp. 18.*
Ragi et al. "UAV Path Planning in a Dynamic Environment via Partially Observable Markov Decision Process", IEEE TAES, 2013, pp. 2397-2412.*
Silver, et al., "Mastering the game of Go with deepneural networks and tree search", Nature, vol. 529, Jan. 28, 2016, pp. 484-489.
International Search Report and Written Opinion of PCT Application No. PCT/JP2019/014090, issued on Jun. 25, 2019, 08 pages of ISRWO.

* cited by examiner

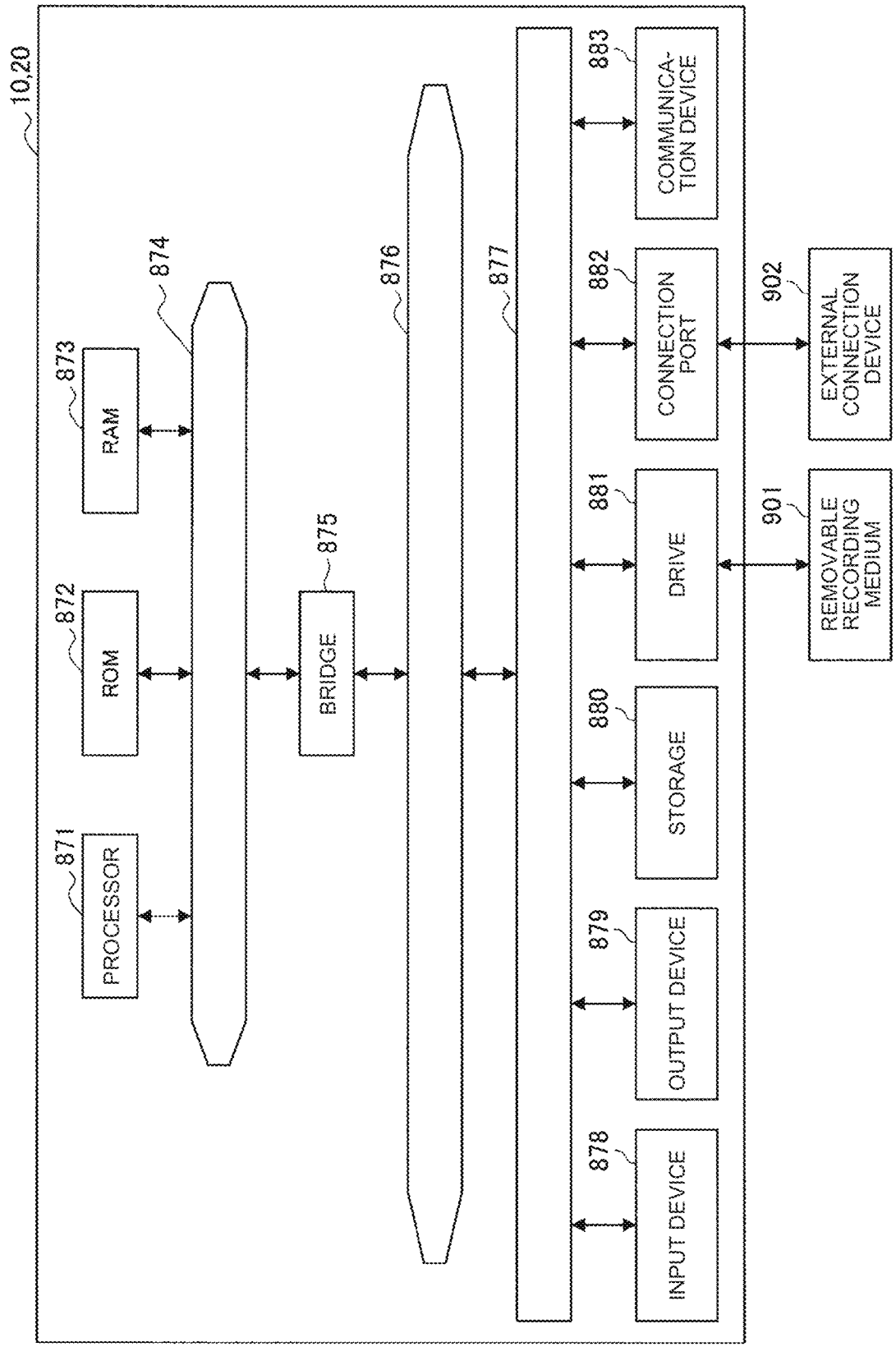

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2019/014090 filed on Mar. 29, 2019, which claims priority benefit of Japanese Patent Application No. JP 2018-114295 filed in the Japan Patent Office on Jun. 15, 2018. Each of the above-referenced applications is hereby incorporated herein by reference in its entirety.

FIELD

The present disclosure relates to an information processing device and an information processing method.

BACKGROUND

In recent years, various types of path searching algorithms have been studied. Moreover, devices that operate on the basis of paths searched for by the algorithms, have been developed. For example, Non Patent Literature 1 discloses a computer program of searching for the next action in the game of go with a search algorithm.

CITATION LIST

Non Patent Literature

Non Patent Literature 1: David Silver et al., "Mastering the game of Go with deepneural networks and tree search", Nature, volume 529, pages 484-489, 28 Jan. 2016.

SUMMARY

Technical Problem

However, the technology in Non Patent Literature 1 is a framework for acquisition of a value function and policy in path searching due to heuristics learning with deep learning. Thus, it is difficult to say that the technology is versatile. Moreover, the technology has room for improvement in search time.

Therefore, an object of the present disclosure is to propose a novel and improved information processing device and a novel and improved information processing method that enable learning of versatile heuristics with a large reduction in search time.

Solution to Problem

According to the present disclosure, an information processing device is provided that includes: a learning unit configured to learn a heuristics function according to path searching, with a convolutional neural network, wherein the convolutional neural network carries out learning based on a plurality of obstacle maps, to output a heuristics map expressing the heuristics function as a two or more dimensional image.

Moreover, according to the present disclosure, an information processing device is provided that includes: a search unit configured to perform path searching, based on a learned heuristics function, wherein the search unit performs the path searching, based on the heuristics function expressed as a two or more dimensional image, acquired by learning based on a plurality of obstacle maps.

Moreover, according to the present disclosure, an information processing method is provided that includes: learning a heuristics function according to path searching, by a processor, with a convolutional neural network, wherein the convolutional neural network carries out learning based on a plurality of obstacle maps, to output a heuristics map expressing the heuristics function as a two or more dimensional image.

Moreover, according to the present disclosure, an information processing method is provided that includes: performing path searching, based on a learned heuristics function, by a processor, wherein the performing the path searching further includes performing path searching based on the heuristics function expressed as a two or more dimensional image, acquired by learning based on a plurality of obstacle maps.

Advantageous Effects of Invention

As described above, the present disclosure enables learning of versatile heuristics with a large reduction in search time.

Note that the effect is not necessarily restrictive, and thus any of the effects described in the present specification or other effects that can be grasped from the present specification may be provided in addition to or instead of the effect.

BRIEF DESCRIPTION OF DRAWINGS

FIG. 15 is a diagram of an exemplary hardware configuration according to the embodiment of the present disclosure.

DESCRIPTION OF EMBODIMENTS

Figure 1:
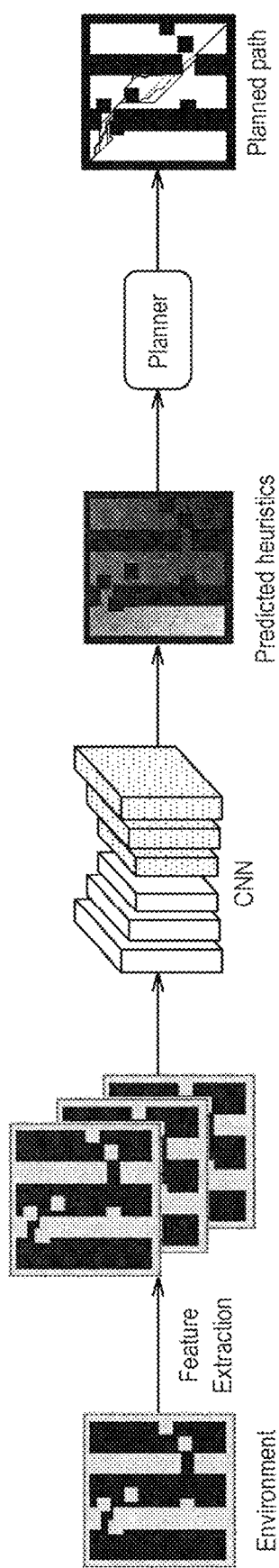
FIG. 1 is a diagram of an outline of heuristics learning according to an embodiment of the present disclosure.

A preferred embodiment of the present disclosure will be described in detail below with reference to the accompanying drawings. Note that, in the present specification and the drawings, constituent elements having substantially the same functional configurations are denoted with the same reference signs, and thus the duplicate descriptions thereof will be omitted.

Note that the description will be given in the following order.
1. Embodiment
1.1. Learning Technique
1.2. Exemplary Functional Configuration of Learning Device
1.3. Exemplary Functional Configuration of Search Device 20
1.4. Effects
1.5. Exemplary Applications
2. Exemplary Hardware Configuration
3. Summary 1. Embodiment <<1.1. Learning Technique>>

First, an outline of an embodiment of the present disclosure will be described. As described above, in recent years, devices that operate on the basis of results of path searching with search algorithms, have been developed. Examples of the devices include an autonomous navigation robot and various types of manipulators.

Moreover, examples of the search algorithms include an A* search algorithm and a rapidly exploring random tree (RRT). For example, the A* or RRT search algorithm causes performance of path searching with a heuristics function.

Typically, in global path planning according to an autonomous navigation robot or manipulation, plenty of time is required for searching. Here, for reduction in search time and improvement in search accuracy, it is important to set the heuristics function.

In general, the heuristics function for solving a path planning problem is often set by an experimenter. However, a more intricate path or task makes a proper heuristics function difficult to set. Thus, there is a limit to manual acquisition of an optimum heuristics function.

The technical idea according to the present disclosure has been made in consideration of the above point, and enables learning of versatile heuristics with a large reduction in search time. Therefore, a learning device 10 that achieves an information processing method according to the embodiment of the present disclosure, includes a learning unit 120 that learns a heuristics function according to path searching, with a convolutional neural network (CNN). Moreover, the CNN according to the embodiment of the present disclosure has a feature of carrying out learning based on a plurality of obstacle maps to output a heuristics map expressing the heuristics function as a two or more dimensional image.

As above, the CNN according to the embodiment of the present disclosure is capable of outputting a heuristics map expressing the heuristics function as an image. The feature enables image visualization of the heuristics function expressed conventionally as a numerical expression, so that an experimenter or the like can intuitively grasp the distribution of heuristics.

Here, first, an outline of graph searching according to the embodiment of the present disclosure will be described. In the information processing method according to the embodiment of the present disclosure, path planning based on searching in graph G=<V, E> is regarded as fundamental. In this case, the graph searching according to the embodiment of the present disclosure starts from the start node V. In evaluation of each node, a search candidate for the next is expanded on the basis of Succ (V), where a subsequent edge and a child vertex are returned.

First, a search-candidate vertex is given on the basis of Valid (e, v, ϕ). Here, e represents environment, and a value is determined on the basis of an obstacle corresponding to ϕ, so that False is returned. Next, a search candidate is evaluated on the basis of Score (v, ϕ), and a combination of score and vertex is repeatedly inserted into a queue such as (open list): 0 given priority ranking based on the score in a subsequent-vertex open list, until the goal Vg is found or no vertex is left.

In this case, the score function defined by the cost-so-far value of the vertex being currently evaluated is given, for example, by the following Numerical Expression (1) in a Dijkstra's search algorithm. Note that the cost-so-far value indicates the accumulated cost along the shortest path found at the time of searching.

$$\text{Score}(v,\phi)=g(v,\phi) \quad (1)$$

Moreover, in the information processing method according to the embodiment of the present disclosure, a search heuristics function h(v, ϕ) is defined, so that the A* search algorithm can be derived from the score function indicated by the following Numerical Expression (2).

$$\text{Score}(v,\phi)=g(v,\phi)+h(v,\phi) \quad (2)$$

Moreover, according to the embodiment of the present disclosure, a search dependent on only heuristics as a greedy search algorithm is defined by the following Numerical Expression (3).

$$\text{Score}(v,\phi)=h(v,\phi) \quad (3)$$

Next, heuristics learning with the CNN according to the embodiment of the present disclosure will be described. The information processing method according to the embodiment of the present disclosure enables learning of an excellent heuristics function of minimizing the search cost (minimizing the number of open vertex candidates during searching).

FIG. 1 is a diagram of an outline of the heuristics learning according to the embodiment of the present disclosure. As illustrated in FIG. 1, the information processing method according to the embodiment of the present disclosure includes taking in, as an environment, at least one of an obstacle map and a cost function, inputting an extracted feature map into the CNN, and predicting the heuristics value of each node in the graph. The CNN according to the embodiment of the present disclosure is capable of outputting a heuristics map expressing, as a two or more dimensional image, the predicted heuristics value according to each node.

Moreover, the predicted heuristics values included in the heuristics map are used as the heuristics function h(v, ϕ) in a graph-search-based planner (corresponding to a search device 20 to be described later). The planner is capable of performing path planning at high speed, on the basis of the heuristics map output by the CNN and an arbitrary search algorithm.

Note that the CNN according to the embodiment of the present disclosure may be a fully convolutional network (FCN). The FCN according to the embodiment of the present disclosure is capable of predicting the heuristics values according to all nodes in the graph, simultaneously (one-shot learning).

Meanwhile, the CNN according to the embodiment of the present disclosure may be achieved, for example, by use of cuDNN with general-purpose computing on graphics processing units (GPGPU) implemented.

Figure 2:
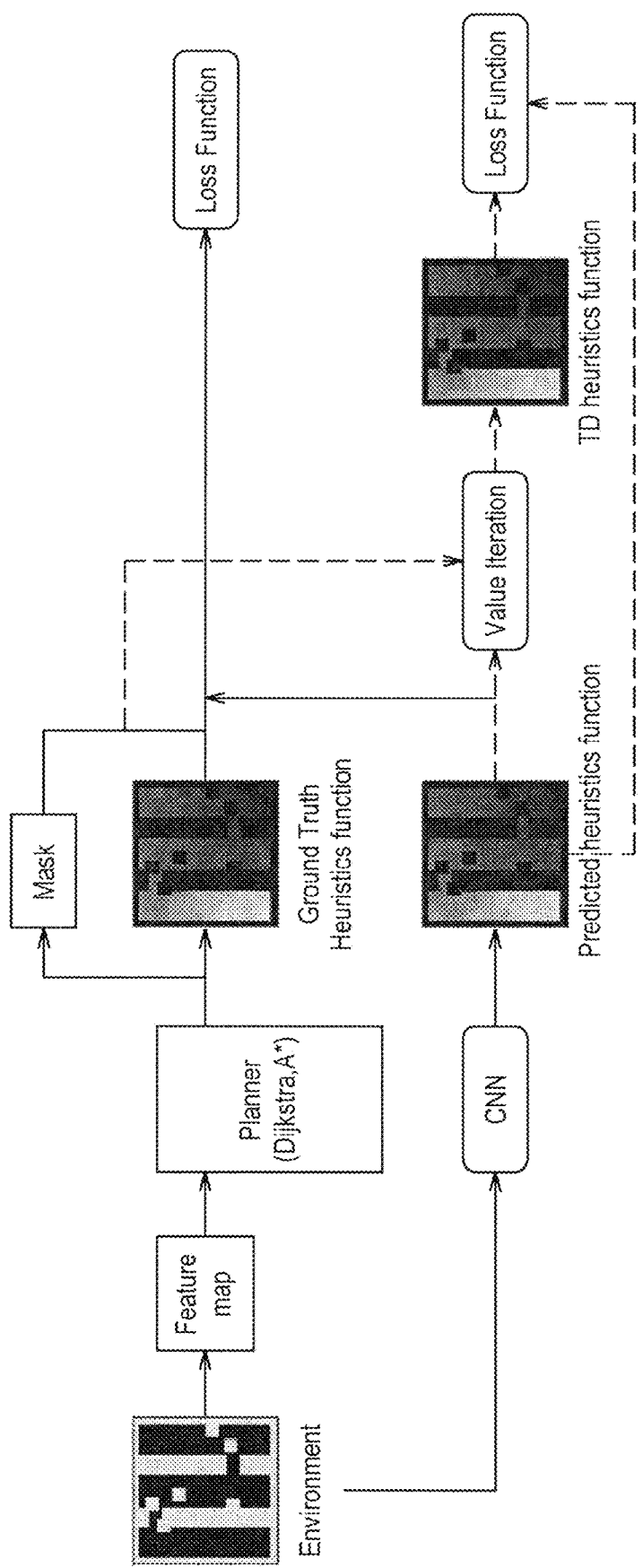
FIG. 2 is an explanatory diagram of learning algorithms according to the embodiment.

Moreover, in the heuristics learning with the CNN according to the embodiment of the present disclosure, heuristics values are generated with a planner for learning and then are used as targets for predicted heuristics values in learning by the CNN. Three learning algorithms will be exemplified below. FIG. 2 is an explanatory diagram of the learning algorithms according to the embodiment of the present disclosure.

One of the three learning algorithms is dense target learning with a backward Dijkstra's algorithm. In the dense target learning with the backward Dijkstra's algorithm according to the embodiment of the present disclosure, the CNN minimizes the squared error between the predicted cost and target cost of each node, resulting in direct learning of heuristics.

In this case, the cost of each vertex is defined as the accumulated cost (cost-so-far value) along the shortest path to the target. The backward Dijkstra's algorithm enables calculation of the cost-so-far values according to all the effective vertices in the graph.

Moreover, in the dense target learning with the backward Dijkstra's algorithm according to the embodiment of the present disclosure, learning is carried out with minimization of the loss function indicated by the following Numerical Expression (4).

$$L(\phi, \hat{H}, M) = \sum_{v \in V} (h(v, \phi) \rightarrow H(v))^2 M(v) \quad (4)$$

Here, H in the above Numerical Expression (4) represents a target cost value map generated by the backward Dijkstra's algorithm (cost-to-go value map corresponding to the ground truth heuristics function in FIG. 2). Moreover, M represents a mask for ignoring any ineffective vertex disabling backward Dijkstra searching (e. g., an area occupied by an obstacle or an area surrounded by obstacles).

Next, another learning algorithm will be described. The another learning algorithm according to the embodiment of the present disclosure is target learning with the A* search algorithm. The backward Dijkstra's algorithm described above causes calculation of the cost-so-far values according to all the effective vertices in the graph. Thus, for a large-scale problem (e. g., a path planning problem in a huge 2D grid map or high-dimensional map), the calculation time often lengthens, so that a bottleneck is likely to occur in heuristics learning.

Therefore, according to the embodiment of the present disclosure, proposed is a learning technique dependent on only the target cost values of the vertices belonging to the shortest path with the A* search algorithm given the start position and end position randomly sampled.

The A* search algorithm is much faster in speed than the Dijkstra's algorithm and the backward Dijkstra's algorithm, and enables more efficient achievement of data correction regarding environmental variation. Note that, similarly to a case where the backward Dijkstra's algorithm is used, the above Numerical Expression (4) is used as the loss function. Meanwhile, in a case where the A* search algorithm is used, the mask M has 1 at any vertex along the path.

Next, the other learning algorithm will be described. The other learning algorithm according to the embodiment of the present disclosure is target learning with temporal difference (TD) error minimization. The target learning with TD error minimization according to the embodiment of the present disclosure enables reduction of the possibility that a learning result is poor due to a sparse target signal like a case where the A* search algorithm described above is used.

In the target learning with TD error minimization according to the embodiment of the present disclosure, a combination of a TD learning technique and a learning technique with a sparse supervisory signal, such as the A* search algorithm is used. In this case, the TD error can be acquired by updating of h due to a single step of value iteration as indicated by the following Numerical Expression (5).

$$\bar{h}(v) \leftarrow \min_{(e,v') \in Succ(v)} Cost(e, v') + \bar{h}(v') \quad (5)$$

In this case, ¯h(v) is initialized with the current predicted heuristics value h(v, ϕ), ¯h (v$_g$)=0, ¯h(v∈V$_{invalid}$)=∞. The value iteration is an off-policy algorithm, and thus enables sampling of all the vertices in the graph.

Note that, according to the embodiment of the present disclosure, for acquisition of a denser target cost value (cost-to-go value), one-time value iteration updating is performed. Moreover, the loss function is expressed by the following Numerical Expression (6) with the updated cost-to-go estimation ¯h (v)

$$L(\phi, \hat{H}, M) = \sum_{v \in V} \left\{ (h(v, \phi) - H(v))^2 M(v) + \lambda (h(v, \phi) - \bar{h}(v))^2 M_{TD}(v) \right\} \quad (6)$$

Here, $M_{TD}(v)$ in the above Numerical Expression (6) has 1 with M∩V$_{valid}$ and otherwise 0. Moreover, λ balance represents the weight according to TD minimized loss.

Next, the CNN according to the embodiment of the present disclosure will be described in detail. As described above, the CNN according to the embodiment of the present disclosure carries out learning based on a plurality of dimensional obstacle maps, so that output can be a heuristics map expressing the heuristics function as a two or more dimensional image.

In this case, the CNN may output a heuristics map expressed as an image identical in dimensions to the obstacle maps.

More specifically, a feature map extracted on the basis of two or more dimensional obstacle maps is input to the CNN according to the embodiment of the present disclosure. Here, the feature map may include a two or more dimensional map, obstacle information in the two or more dimensional map, and path information in the two or more dimensional map.

Note that, for example, the obstacle information may include information according to the distance from an obstacle. Moreover, the path information may include information according to the cost to the goal point. For example, the cost to the goal point may be expressed with the distance to the goal point. Moreover, for example, the distance to the goal point may be given as a channel to the image.

The CNN according to the embodiment of the present disclosure includes two parts of an encoder CNN and a decoder CNN.

The encoder CNN includes three convolution modules, in which one of the three convolution modules is 16, another is 32, and the other is 64 in the number of channels.

Moreover, each convolution module has three convolution layers, in which batch normalization and a leaky ReLU are disposed behind each convolution layer.

Moreover, among the three convolution layers, for example, the stride width of the first convolution layer may be 2. Moreover, the dilation factor of the kernel is incremented to 1 to 3.

Meanwhile, the decoder CNN includes three deconvolution modules. The deconvolution modules are similar in basic configuration to the convolution modules except that the first layer is a deconvolution layer. Note that the kernel size is 4×4 and the upscaling factor may be 2.

Note that one of the modules is 32, another is 16, and the other is 16 in the number of channels. Note that the last module outputs a heuristics map in output for one channel.

The configuration of the CNN according to the embodiment of the present disclosure has been described above. According to the embodiment of the present disclosure, the heuristics function can be easily defined without manpower. Moreover, a versatile heuristics function can be applicable to, for example, a three-dimensional intricate path or task.

Moreover, for example, the CNN according to the embodiment of the present disclosure is capable of outputting the heuristics function expressed, from a two-dimensional image, as a two-dimensional image and outputting the heuristics function expressed, from a three-dimensional image, as a three-dimensional image. Thus, the CNN is capable of carrying out direct and simple learning regardless of the size of an input image.

<<1.2. Exemplary Functional Configuration of Learning Device 10>>

Figure 3:
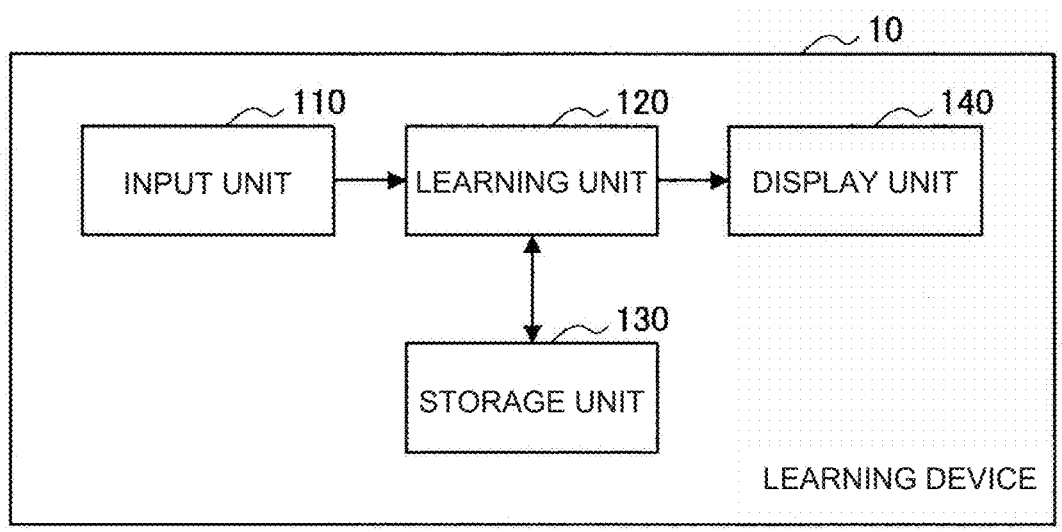
FIG. 3 is a block diagram of an exemplary functional configuration of a learning device according to the embodiment.

Next, an exemplary functional configuration of the learning device 10 according to the embodiment of the present disclosure will be described. The learning device 10 according to the embodiment of the present disclosure is an information processing device that carries out heuristics learning with the CNN described above and outputs a heuristics map expressing the heuristics function as a two or more dimensional image. FIG. 3 is a block diagram of the exemplary functional configuration of the learning device 10 according to the embodiment of the present disclosure. Referring to FIG. 3, the learning device 10 according to the embodiment of the present disclosure includes an input unit 110, a learning unit 120, a storage unit 130, and a display unit 140.

(Input Unit 110)

The input unit 110 according to the embodiment of the present disclosure receives, for example, an image, various types of data, or operation information regarding a user. The input unit 110 according to the embodiment of the present disclosure includes, for example, a keyboard, a mouse, and a touch panel.

(Learning Unit 120)

The learning unit 120 according to the embodiment of the present disclosure has a function of learning the heuristics function according to path searching, with the CCN. As described above, the CNN according to the embodiment of the present disclosure has a feature of carrying out learning based on a plurality of obstacle maps to output a heuristics map expressing the heuristics function as a two or more dimensional image.

(Storage Unit 130)

The storage unit 130 according to the embodiment of the present disclosure stores, for example, a program and data used in each constituent included in the learning device 10. The storage unit 130 according to the embodiment of the present disclosure stores, for example, various types of parameters according to the CNN and a heuristics map output from the CNN.

(Display Unit 140)

The display unit 140 according to the embodiment of the present disclosure displays various types of visual information. Thus, the display unit 140 according to the embodiment of the present disclosure includes, for example, a display device that presents visual information. Examples of the display device include a liquid crystal display (LCD) device, an organic light emitting diode (OLED) device, and a touch panel.

The display unit 140 according to the embodiment of the present disclosure displays, for example, a process of learning by the CNN or a heuristics map output from the CNN.

The exemplary functional configuration of the learning device 10 according to the embodiment of the present disclosure has been described above. Note that the configuration described with FIG. 3 is just exemplary, and thus the functional configuration of the learning device 10 according to the embodiment of the present disclosure is not limited to the example. The functional configuration of the learning device 10 according to the embodiment of the present disclosure can be flexibly modified in accordance with specifications or operations.

<<1.3. Exemplary Functional Configuration of Search Device 20>>

Next, an exemplary functional configuration of the search device 20 according to the embodiment of the present disclosure will be described. The search device 20 according to the embodiment of the present disclosure is an information processing device that performs path searching with a heuristics map generated by the learning device 10 and an arbitrary search algorithm. Examples of the search device 20 according to the embodiment of the present disclosure may include various types of autonomous navigation robots and manipulators.

Figure 4:
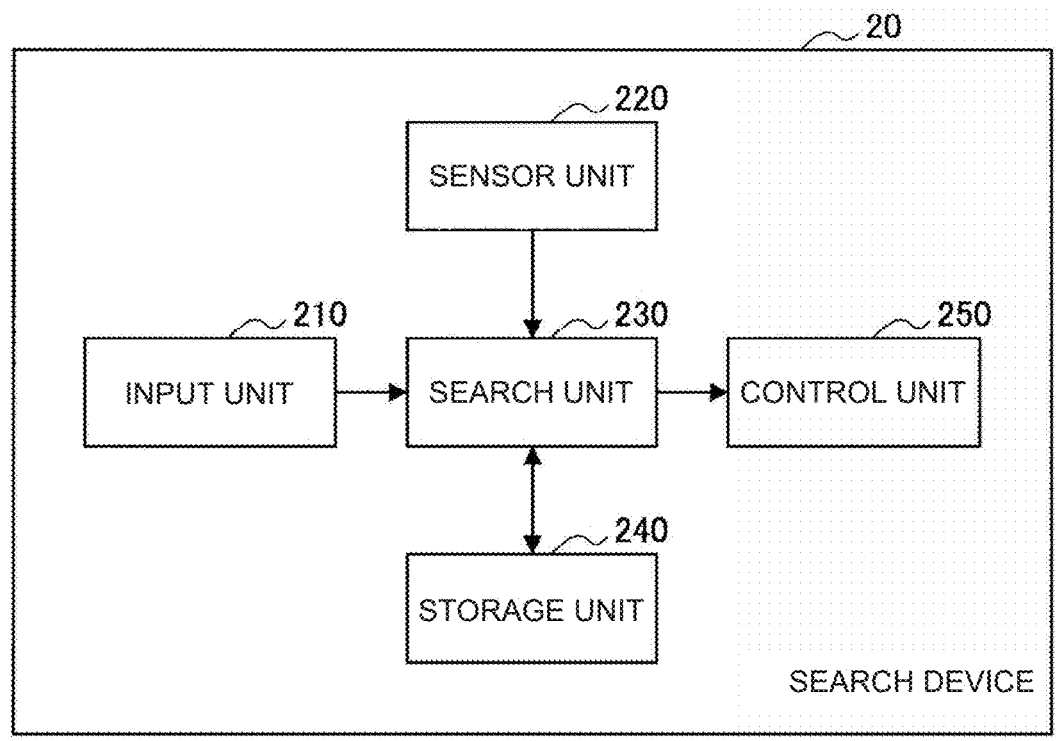
FIG. 4 is a block diagram of an exemplary functional configuration of a search device according to the embodiment.

FIG. 4 is a block diagram of the exemplary functional configuration of the search device 20 according to the embodiment of the present disclosure. Referring to FIG. 4, the search device 20 according to the embodiment of the present disclosure includes an input unit 210, a sensor unit 220, a search unit 230, a storage unit 240, and a control unit 250.

(Input Unit 210)

The input unit 210 according to the embodiment of the present disclosure receives, for example, an image including a heuristic map, various types of data, or operation information regarding a user. For example, the user can set a goal point through the input unit 210. The input unit 210 according to the embodiment of the present disclosure includes, for example, a keyboard, a mouse, a touch panel, and a button.

(Sensor Unit 220)

The sensor unit 220 according to the embodiment of the disclosure has a function of sensing the state of ambient environment. The sensor unit 220 according to the embodiment of the present disclosure includes, for example, various types of optical sensors including an image pickup senor and an infrared sensor, an acceleration sensor, a gyro sensor, a geomagnetic sensor, a thermo-sensor, a vibration sensor, and a global navigation satellite system (GNSS) signal receiver.

Moreover, the sensor unit 220 according to the embodiment of the present disclosure may perform ambient-environmental state estimation, obstacle recognition, or self-position estimation based on the collected sensor information.

(Search Unit 230)

The search unit 230 according to the embodiment of the present disclosure has a function of performing path searching on the basis of the heuristics function learned by the learning device 10. More specifically, the search unit 230 according to the embodiment of the present disclosure has a feature of performing path searching on the basis of a heuristics map expressed as a two or more dimensional image, acquired by learning based on a plurality of obstacle maps.

The feature of the search unit 230 according to the embodiment of the present disclosure enables achievement of enhancement in the speed of the entire task with a large reduction in the number of steps required for searching, and additionally enables the search device 20 to operate on the basis of the properly grasped situation. Thus, highly remarkable development due to intellectual control can be achieved.

Note that the search unit 230 according to the embodiment of the present disclosure may perform path searching with a heuristics map learned by the learning device 10 and an arbitrary search algorithm. The search algorithm is, for example, the A* search algorithm.

(Storage Unit 240)

The storage unit 240 according to the embodiment of the present disclosure stores, for example, a program and data used in each constituent included in the search device 20. The storage unit 240 according to the embodiment of the present disclosure stores, for example, map information, a goal setting, and a heuristics map.

(Control Unit 250)

The control unit 250 according to the embodiment of the present disclosure performs operation control corresponding to the specifications of the search device 20, on the basis of a path searched for by the search unit 230. For example, in a case where the search device 20 is an automobile, the control unit 250 controls, for example, steering, an accelerator, and a brake to achieve automated driving. Moreover, for example, in a case where the search device 20 is a manipulator, the control unit 250 controls the actuator of each joint to achieve an arbitrary task.

The exemplary functional configuration of the search device 20 according to the embodiment of the present disclosure has been described above. Note that the functional configuration described with FIG. 4 is just exemplary, and thus the functional configuration of the search device 20 according to the embodiment of the present disclosure is not limited to the example. For example, the search device 20 according to the embodiment of the present disclosure may include an object to be controlled by the control unit 250, corresponding to a characteristic of the device. The functional configuration of the search device 20 according to the embodiment of the present disclosure can be flexibly modified in accordance with specifications or operations.

<<1.4. Effects>>

Next, effects of path searching with a heuristics map according to the embodiment of the present disclosure will be described. Experimental data for verifying the usefulness of the learning technique according to the embodiment of the present disclosure, will be described below. Herein, heuristics acquired by the learning technique described above is applied to a toy problem with a SAIL data set.

Note that, in the toy problem, a navigation task of a robot in a two-dimensional grid world including obstacles was designed, and the heuristics function sampled by learning with the Dijkstra's algorithm were used as the base line (full Dijkstra supervised learning: FDSL) and the heuristics function sampled by learning with the A* search algorithm (optimal planner supervised learning: OPSL).

Moreover, according to the embodiment of the present disclosure, experiments were carried out in four environments each having the start point and the goal point set therein. Data was sampled by the planner with the Dijkstra's algorithm and the planner with the A* search algorithm. Through the FDSL or the OPSL with the CNN according to the embodiment of the present disclosure, verification was performed by the A* search algorithm or the greedy algorithm.

FIGS. 5 to 8 each illustrate a heuristics map acquired by the learning technique according to the embodiment of the present disclosure and results of path searching with the heuristics map. Note that FIGS. 5 to 8 each illustrate experimental results according to the heuristics map learned by the OPSL.

Figure 5:
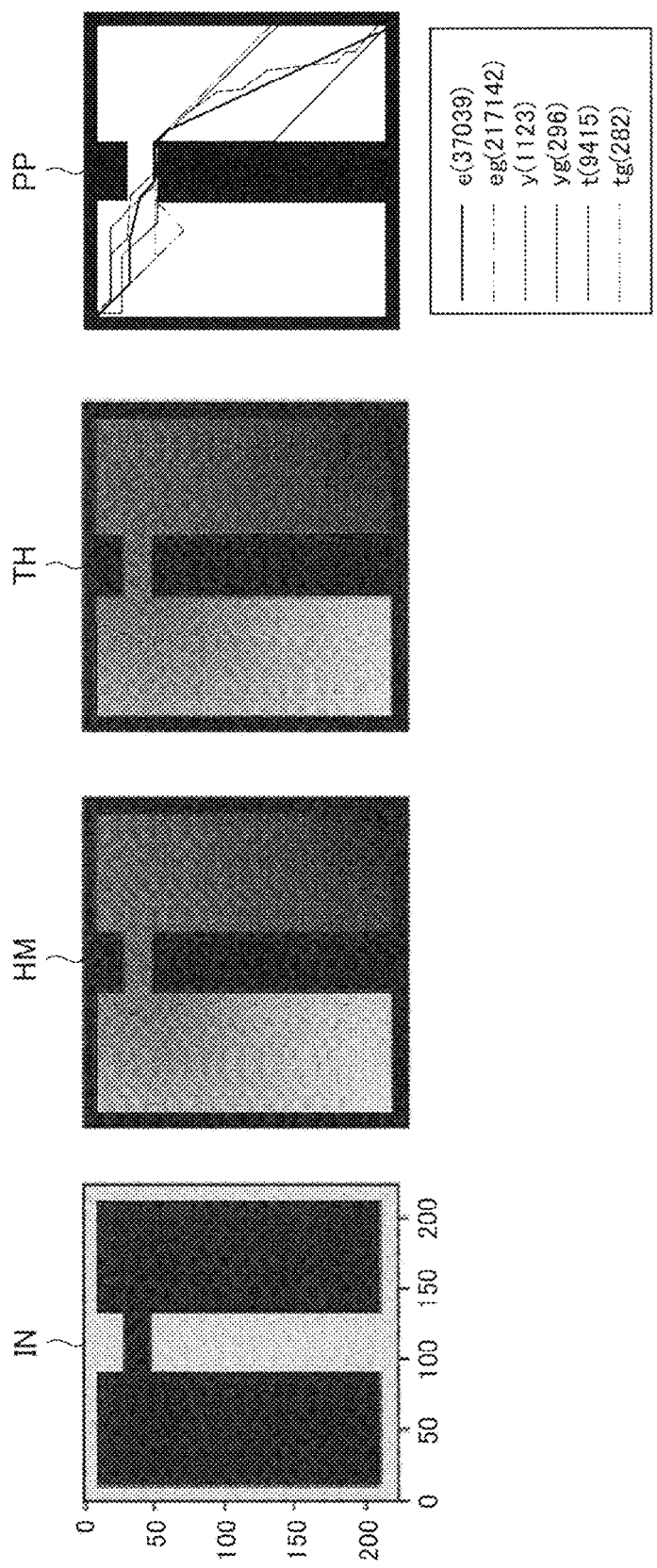
FIG. 5 illustrates a heuristics map acquired by a learning technique according to the embodiment and results of path searching with the heuristics map.
Figure 6:
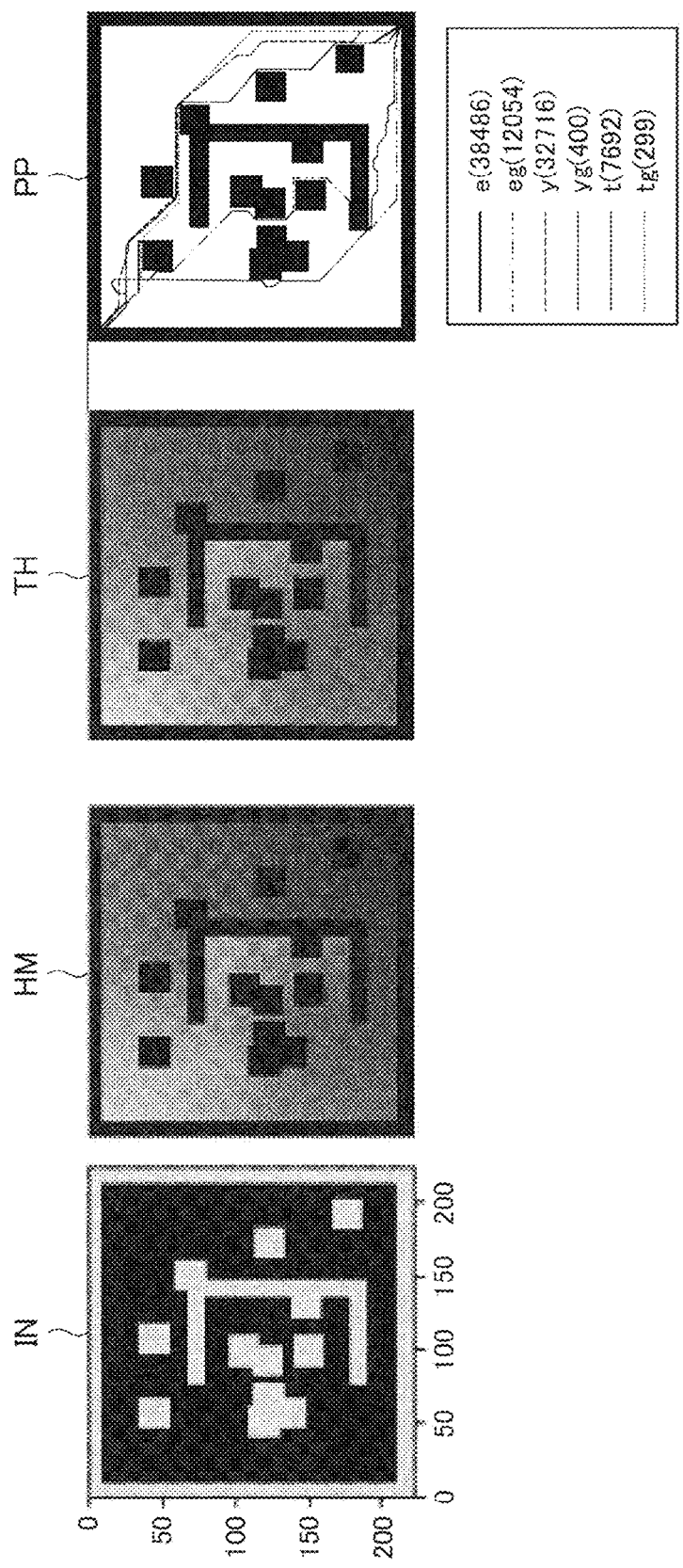
FIG. 6 illustrates a heuristics map acquired by the learning technique according to the embodiment and results of path searching with the heuristics map.
Figure 7:
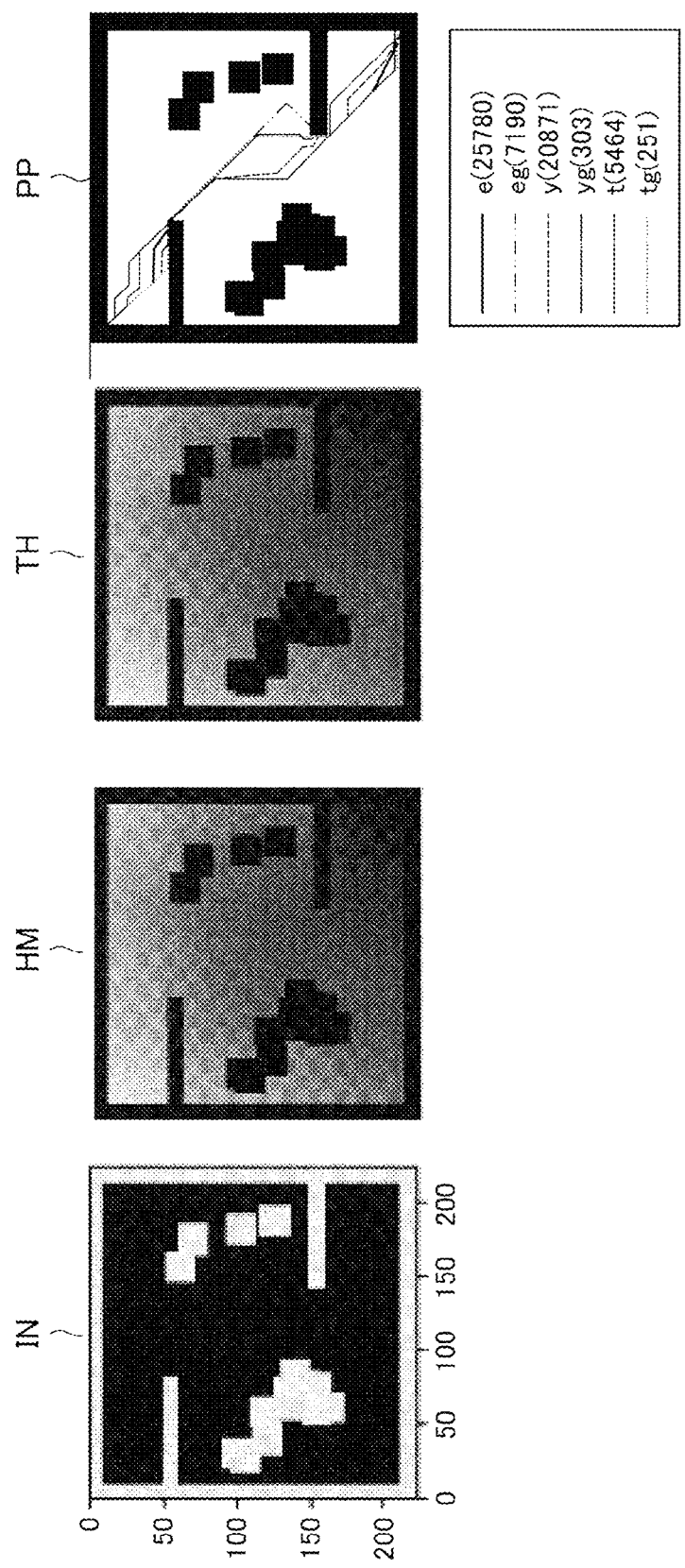
FIG. 7 illustrates a heuristics map acquired by the learning technique according to the embodiment and results of path searching with the heuristics map.
Figure 8:
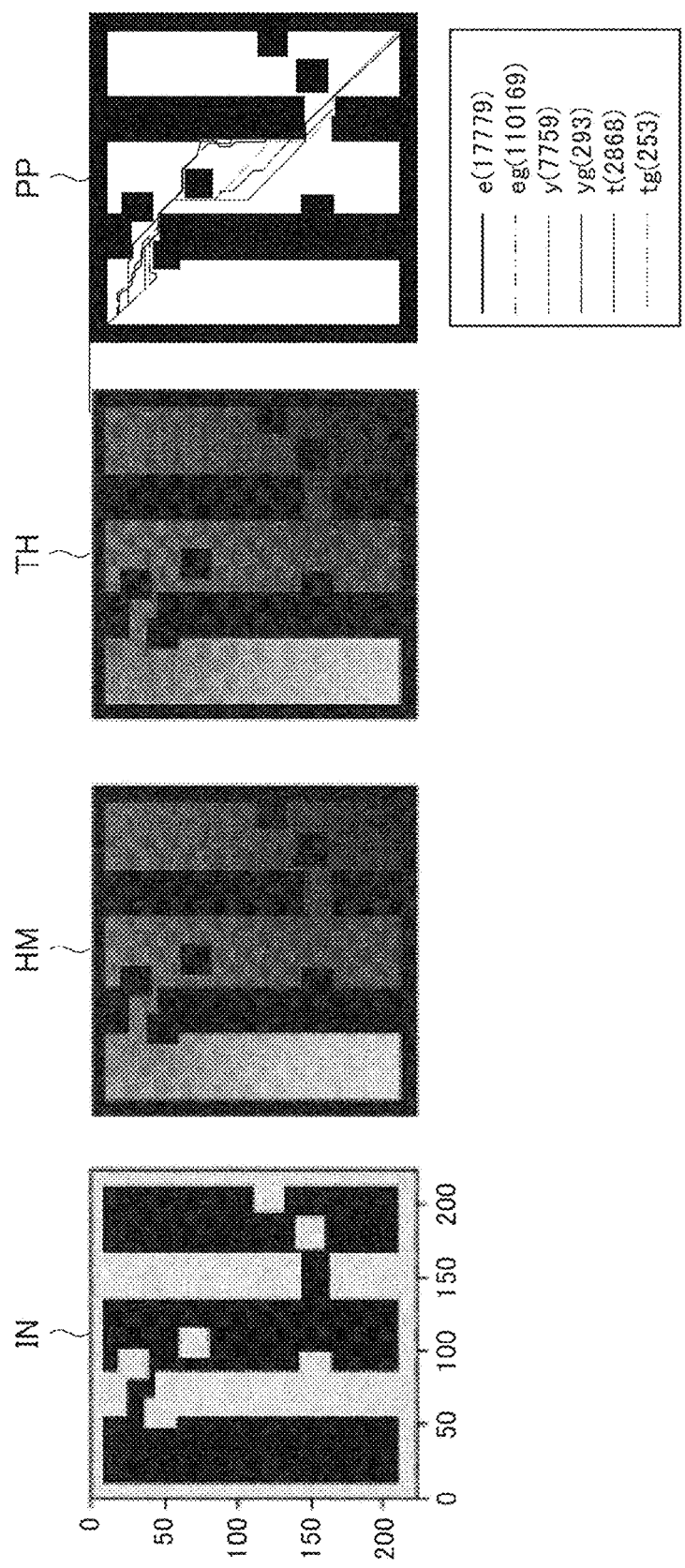
FIG. 8 illustrates a heuristics map acquired by the learning technique according to the embodiment and results of path searching with the heuristics map.

Here, FIG. 5 illustrates experimental results according to a shifting gap environment. FIG. 6 illustrates experimental results according to a bugtrap and forest environment. FIG. 7 illustrates experimental results according to forest. Moreover, FIG. 8 illustrates experimental results according to gap and forest.

In order from the left in FIGS. 5 to 8, indicated are an input image IN, a heuristics map HM output from the CNN according to the embodiment of the present disclosure, a target heuristics function TH, and a search result PP.

Moreover, in FIGS. 5 to 8, the number of search steps is indicated together with the search result PP. Note that, in each figure, e represents a search result from the conventional A* search algorithm (A* and Euclidean distance heuristics), eg represents a search result from the conventional greedy algorithm (greedy and Euclidean distance heuristics), y represents a search result from the A* search algorithm with the heuristics map acquired by the learning technique according to the embodiment of the present disclosure, and yg represents a search result from the greedy algorithm with the heuristics map acquired by the learning technique according to the embodiment of the present disclosure. Moreover, in each figure, t and tg represent, respectively, a target with the Dijkstra's algorithm and the A* search algorithm and a target with the Dijkstra's algorithm and the greedy algorithm.

Focusing on the respective search results PP illustrated in FIGS. 5 to 8, in any of the environments, the search results with the heuristics map acquired by the learning technique according to the embodiment of the present disclosure are more advantageous than the corresponding search results from the conventional techniques. For example, in comparison between e and y in FIG. 5, the respective numbers of search steps are 37039 and 1123. Thus, the learning technique according to the embodiment of the present disclosure clearly enables approximately 97% reduction in the number of search steps. Moreover, in comparison between eg and yg in FIG. 5, the learning technique according to the embodiment of the present disclosure clearly achieves indeed 99% or more improvement in the number of search steps.

As above, the heuristics learning with the information processing method according to the embodiment of the present disclosure enables efficient learning of heuristics for use in path searching and remarkable enhancement in search speed.

Figure 9:
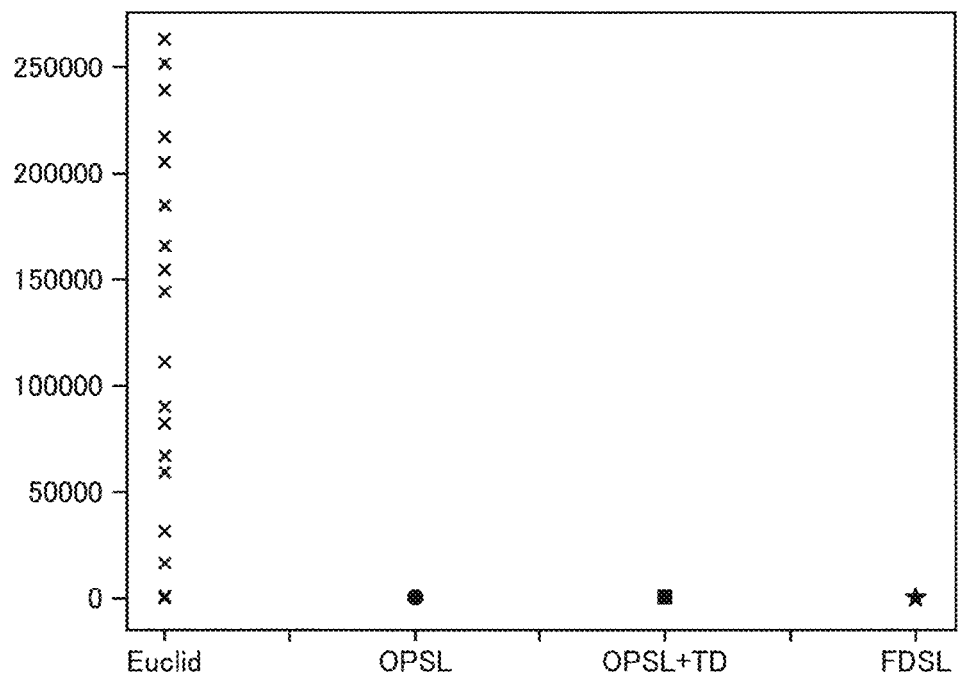
FIG. 9 is a scatter diagram of the respective distributions of search results in an environment according to the embodiment.
Figure 10:
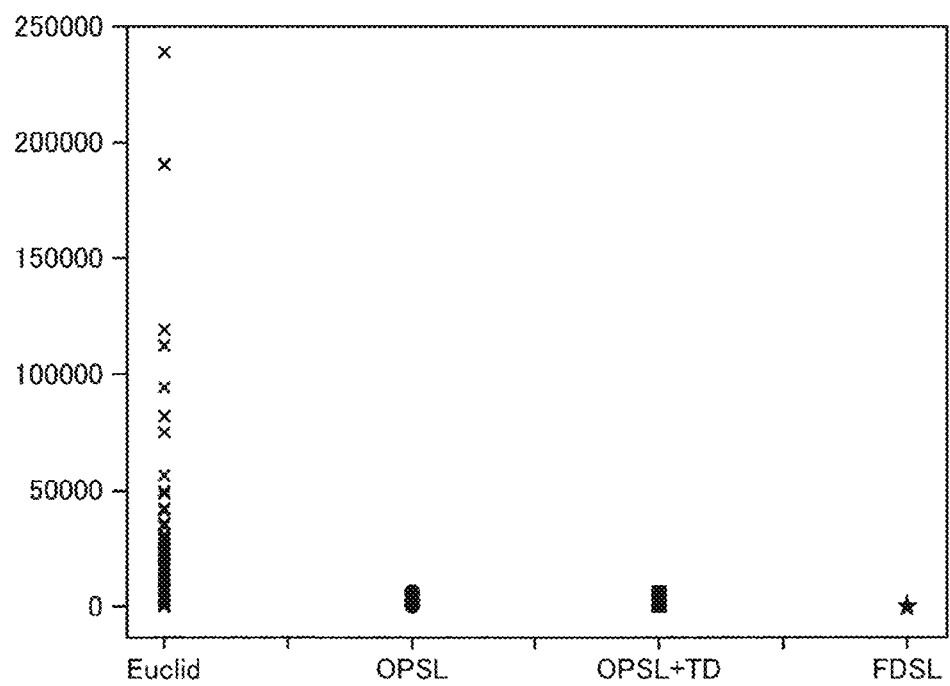
FIG. 10 is a scatter diagram of the respective distributions of search results in an environment according to the embodiment.
Figure 11:
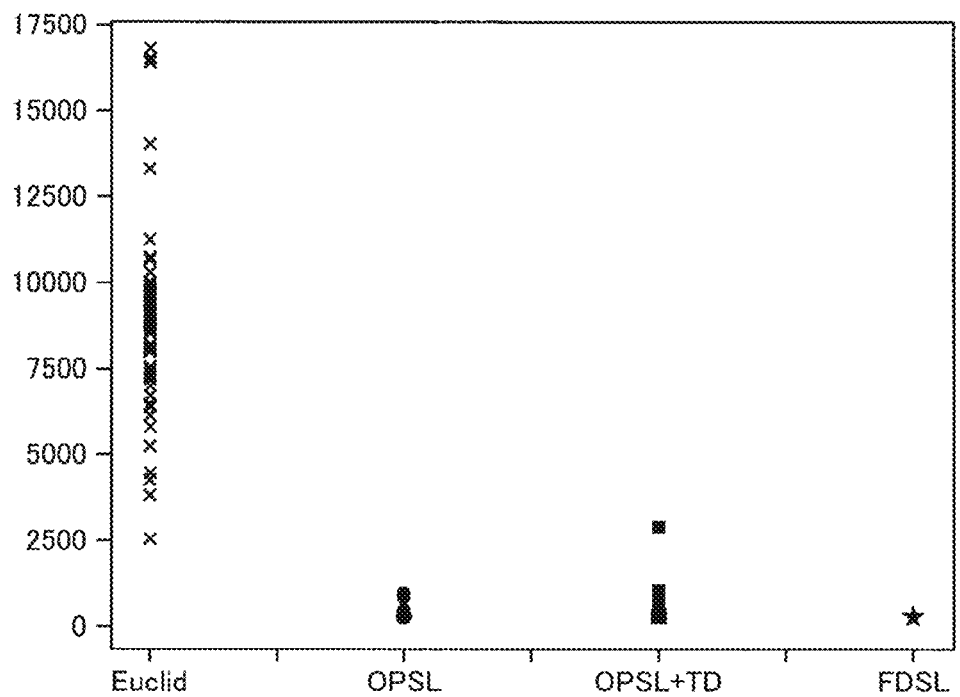
FIG. 11 is a scatter diagram of the respective distributions of search results in an environment according to the embodiment.
Figure 12:
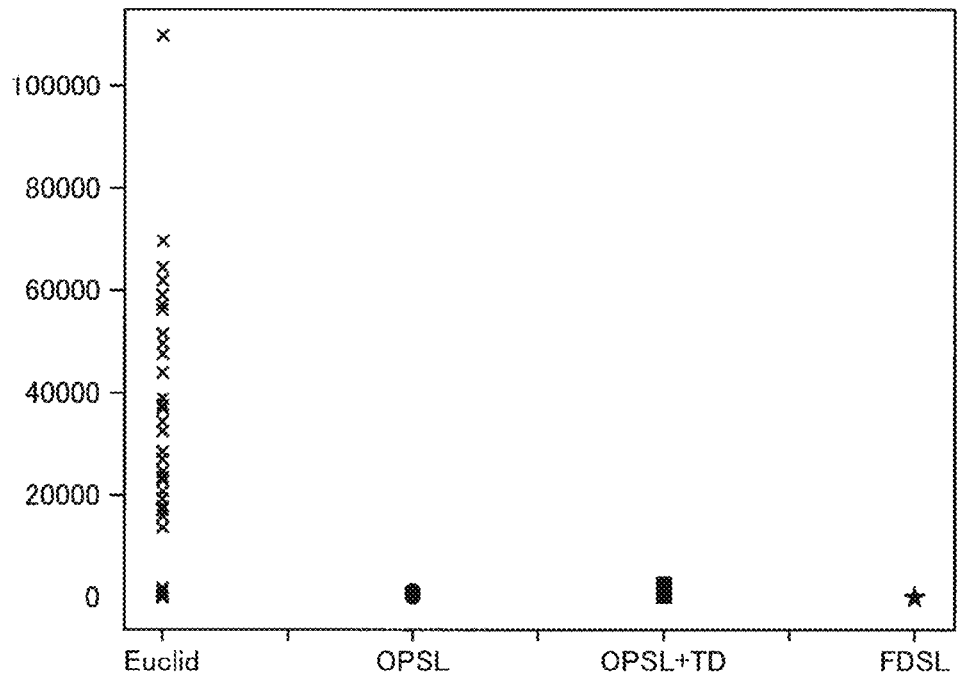
FIG. 12 is a scatter diagram of the respective distributions of search results in an environment according to the embodiment.

Moreover, FIGS. 9 to 12 are scatter diagrams each illustrating the respective distributions of search results in an environment. FIG. 9 illustrates experimental results according to the shifting gap environment. FIG. 10 illustrates experimental results according to the bugtrap and forest environment. FIG. 11 illustrates experimental results according to the forest. Moreover, FIG. 12 illustrates experimental results according to the gap and forest.

In order from the left in FIGS. 9 to 12, indicated are the number of search steps due to conventional Euclidean distance heuristics, the number of search steps due to a heuristics map acquired by the OPSL according to the embodiment of the present disclosure, the number of search steps due to a heuristics map acquired by the OPSL and TD error minimization according to the embodiment of the present disclosure, and the number of search steps due to a heuristics map acquired by the FDSL according to the embodiment of the present disclosure.

Referring to FIGS. 9 to 12, the searching due to any learning technique with a heuristics map according to the embodiment of the present disclosure is clearly much superior to the searching due to the conventional Euclidean distance heuristics.

The effects of path searching with a heuristics map according to the embodiment of the present disclosure have been described above. As described above, the heuristics learning according to the embodiment of the present disclosure enables learning of versatile heuristics with a remarkable reduction in the search time according to path searching.

<<1.5. Exemplary Applications>>

As described above, the path searching with a heuristics map according to the embodiment of the present disclosure enables enhancement in the speed of the entire task that the search device 20 performs, with a large reduction in search steps.

Figure 13:
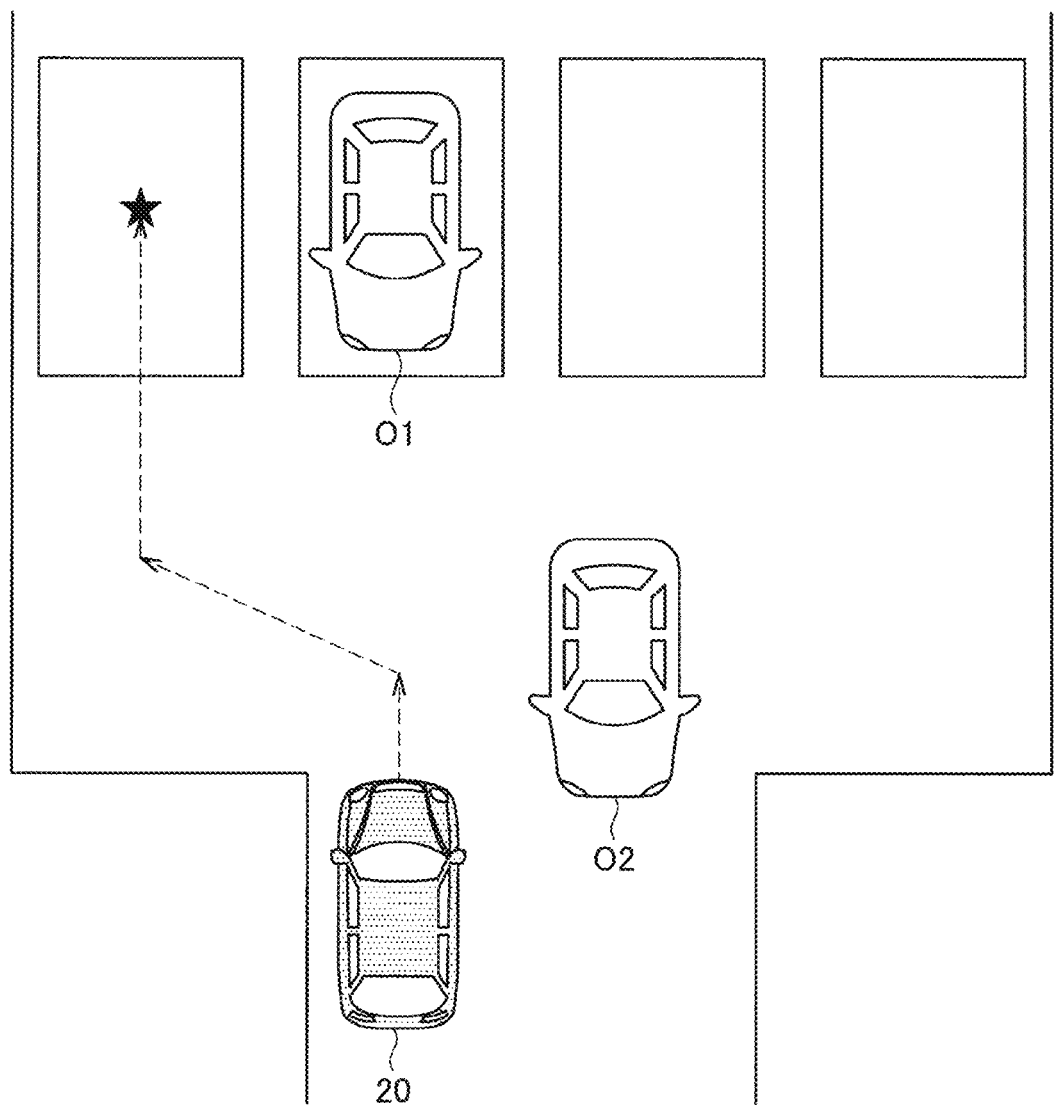
FIG. 13 is an explanatory view of an exemplary case where path searching with a heuristics map according to the embodiment is applied to an automated vehicle.

Here, exemplary applications of the path searching with a heuristics map according to the embodiment of the present disclosure will be given. FIG. 13 is an explanatory view of an exemplary case where the path searching with a heuristics map according to the embodiment of the present disclosure is applied to an automated vehicle.

FIG. 13 illustrates an exemplary case where the search device 20 that is the automated vehicle performs automated driving as a task of parking to a parking space.

In this case, the search device 20 performs, with a heuristics map, path searching in accordance with the ambient environment recognized by the sensor unit 220 or variations in the states of obstacles O1 and O2 that are other vehicles.

For example, as illustrated, in a case where the obstacle O2 that is an automobile is oncoming toward the search device 20, the search device 20 autonomously sets a parking space on the left in the figure as the goal point, and additionally searches for a path leading to the goal point.

After that, if the obstacle O1 is oncoming toward the search device 20, a collision with the obstacle O1 is likely to occur during travelling to the parking space on the left in the figure initially set as the goal point. Thus, the search device 20 can perform path searching again to determine, for example, moving to a parking space on the right in the figure, backing, or stopping ahead.

In this case, the search device 20 according to the embodiment of the present disclosure performs the path searching with a heuristics map described above, so that the determination can be made at high speed. As above, performance of the path searching with a heuristics map according to the embodiment of the present disclosure enables, even in a case where the automated vehicle encounters, for example, sudden appearance of an automobile or a pedestrian, a high-speed search for an avoidance path, resulting in achievement of safer automated driving.

Figure 14:
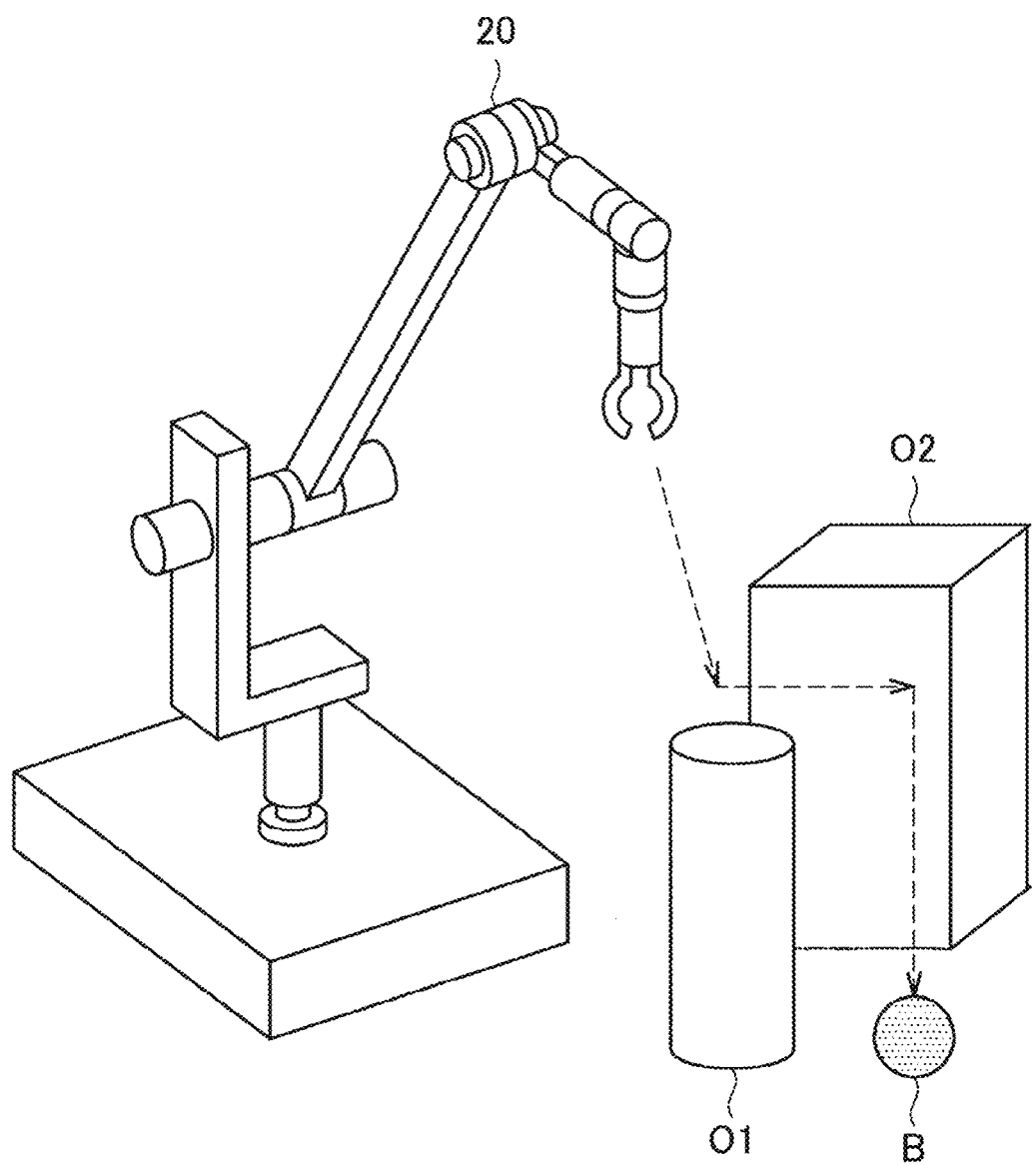
FIG. 14 is an explanatory view of an exemplary case where the path searching with a heuristics map according to the embodiment is applied to a manipulator.

Moreover, FIG. 14 is an explanatory view of an exemplary case where the path searching with a heuristics map according to the embodiment of the disclosure is applied to a manipulator.

FIG. 14 illustrates an exemplary case where the search device 20 that is the manipulator performs a task according to picking of a ball B in an environment in which obstacles O1 and O2 are present.

As above, the path searching with a heuristics map according to the embodiment of the present disclosure is not limited to two-dimensional trajectory control and can be applied to three-dimensional trajectory control. In this case, the learning device 10 according to the embodiment of the present disclosure may input a three-dimensional map thereto to output a heuristics map expressed as a three-dimensional image.

Moreover, similarly to the case of automated driving illustrated in FIG. 13, the search device 20 that is the manipulator may dynamically perform path searching in accordance with the ambient environment or variations in the states of the obstacles. For example, the obstacles O1 and O2 and the ball B illustrated in FIG. 14 each may be an object having movability.

Even in this case, the search device 20 dynamically searches for a path again in accordance with variations in the states of the obstacles O1 and O2 and the ball B recognized by the sensor unit 220, so that the task can be completed on the basis of a result of the searching.

As above, the path searching with a heuristics map according to the embodiment of the present disclosure can be applied to three-dimensional trajectory control difficult to set manually. The path searching with a heuristics map according to the embodiment of the present disclosure enables, for example, in a situation in which a plurality of medical arms each operates autonomously when a medical robot performs an operation, a high-speed search for a trajectory for avoiding a collision between the medical arms, resulting in achievement of a safer operation.

2. Exemplary Hardware Configuration

Next, an exemplary hardware configuration common to the learning device 10 and the search device 20 according to the embodiment of the present disclosure will be described. FIG. 15 is a block diagram of the exemplary hardware configuration of each of the learning device 10 and the search device 20 according to the embodiment of the present disclosure. Referring to FIG. 15, the learning device 10 and the search device 20 each includes, for example, a processor 871, a ROM 872, a RAM 873, a host bus 874, a bridge 875, an external bus 876, an interface 877, an input device 878, an output device 879, a storage 880, a drive 881, a connection port 882, and a communication device 883. Note that the hardware configuration indicated here is exemplary, and thus part of the constituent elements may be omitted. Moreover, a constituent element other than the constituent elements indicated here may be further included.

(Processor 871)

The processor 871 functions, for example, as an arithmetic processing device or a control device, and controls the entirety or part of the operation of each constituent element, on the basis of various types of programs recorded in the ROM 872, the RAM 873, the storage 880 or a removable recording medium 901.

(ROM 872 and RAM 873)

The ROM 872 is a unit that stores, for example, a program that the processor 871 reads or data for use in computation. The RAM 873 temporarily or permanently stores, for example, the program that the processor 871 reads, or various types of parameters that vary appropriately at the time of execution of the program.

(Host Bus 874, Bridge 875, External Bus 876, and Interface 877)

The processor 871, the ROM 872, and the RAM 873 are mutually connected through, for example, the host bus 874 enabling high-speed data transmission. Meanwhile, the host bus 874 is connected to the external bus 876 relatively low in data transmission speed through, for example, the bridge 875. Moreover, the external bus 876 is connected to various types of constituent elements through the interface 877.

(Input Device 878)

As the input device 878, for example, used is a mouse, a keyboard, a touch panel, a button, a switch, or a lever. Furthermore, as the input device 878, in some cases, used is a remote controller (hereinafter, referred to as a remote controller) capable of transmitting a control signal with infrared rays or other radio waves. Moreover, the input device 878 includes a voice input device, such as a microphone.

(Output Device 879)

The output device 879 is a device capable of visually or aurally notifying a user of acquired information, like a display device, such as a cathode ray tube (CRT), an LCD, or an organic EL display, an audio output device, such as a speaker or a headphone, a printer, a mobile phone, or a facsimile. Moreover, the output device 879 according to the present disclosure includes various types of vibration devices capable of outputting tactile stimulus.

(Storage 880)

The storage 880 is a device that stores various types of data. As the storage 880, for example, used is a magnetic storage device, such as a hard disk drive (HDD), a semiconductor storage device, an optical storage device, or a magneto-optical storage device.

(Drive 881)

The drive 881 is a device that reads information recorded in the removable recording medium 901, such as a magnetic disk, an optical disc, a magneto-optical disc, or a semiconductor memory, or writes information to the removable recording medium 901.

(Removable Recording Medium 901)

Examples of the removable recording medium 901 include a DVD medium, a Blu-ray (registered trademark) medium, an HD DVD medium, and various types of semiconductor storage media. Needless to say, the removable recording medium 901 may be, for example, an IC card equipped with a non-contact IC chip, or an electronic device.

(Connection Port 882)

The connection port 882 is a port for connection of an external connection device 902, such as a universal serial bus (USB) port, an IEEE 1394 port, a small computer system interface (SCSI), an RS-232C port, or an optical audio terminal.

(External Connection Device 902)

The external connection device 902 is, for example, a printer, a portable music player, a digital camera, a digital video camera, or an IC recorder.

(Communication Device 883)

The communication device 883 is a communication device that connects with a network. Examples of the communication device 883 include a communication card for a wired or wireless LAN, Bluetooth (registered trademark), or a wireless USB (WUSB), a router for optical communication, a router for asymmetric digital subscriber line (ADSL), and modems for various types of communication.

3. Summary

As described above, the learning device 10 that achieves the information processing method according to the embodiment of the present disclosure, includes the learning unit 120 that learns the heuristics function according to path searching, with the convolutional neural network. Moreover, the CNN according to the embodiment of the present disclosure has a feature of carrying out learning based on a plurality of obstacle maps to output a heuristics map expressing the heuristics function as a two or more dimensional image. The configuration enables learning of versatile heuristics with a large reduction in search time.

The preferred embodiment of the present disclosure has been described in detail above with reference to the accompanying drawings. However, the technical scope of the present disclosure is not limited to the embodiment. It is obvious that those skilled in the technical field of the present disclosure can conceive various types of alternations or corrections within the scope of the technical idea in the claims. Thus, it is rightfully understood that such alternations and corrections belong to the technical scope of the present disclosure.

Moreover, the effects described in the present specification are just explanatory or exemplary, and thus are not restrictive. That is, in addition to or instead of the effects, the technology according to the present disclosure can provide other effects obvious to those skilled in the art from the description of the present specification.

Moreover, created can be a program for causing hardware, such as a CPU, a ROM, and a RAM, built in a computer, to have a function equivalent to the configuration of the learning device 10 or the search device 20. Furthermore, provided can be a computer-readable recording medium in which the program is recorded.

Note that the following configurations belong to the technical scope of the present disclosure.

(1)

An information processing device comprising:
    a learning unit configured to learn a heuristics function according to path searching, with a convolutional neural network, wherein
    the convolutional neural network carries out learning based on a plurality of obstacle maps, to output a heuristics map expressing the heuristics function as a two or more dimensional image.

(2)
   The information processing device according to (1), wherein
   the convolutional neural network outputs the heuristics map expressed as an image identical in dimensions to the plurality of obstacle maps.
(3)
   The information processing device according to (1) or (2), wherein
   the convolutional neural network inputs a feature map extracted based on the plurality of obstacle maps to output the heuristics map.
(4)
   The information processing device according to (3), wherein
   the feature map includes a two or more dimensional map, obstacle information in the two or more dimensional map, and path information in the two or more dimensional map.
(5)
   The information processing device according to (4), wherein
   the path information includes at least information according to cost to a goal point.
(6)
   The information processing device according to (5), wherein
   the cost to the goal point is distance to the goal point.
(7)
   The information processing device according to (4), wherein
   the obstacle information includes at least information according to distance from an obstacle.
(8)
   The information processing device according to any one of (1) to (7), wherein
   the convolutional neural network carries out target learning with a backward Dijkstra's algorithm, to output the heuristics map.
(9)
   The information processing device according to any one of (1) to (8), wherein
   the convolutional neural network carries out target learning with an A* search algorithm, to output the heuristics map.
(10)
   The information processing device according to any one of (1) to (9), wherein
   the convolutional neural network carries out target learning with TD error minimization, to output the heuristics map.
(11)
   The information processing device according to (10), wherein
   the convolutional neural network carries out the target learning with the TD error minimization, with a combination of TD learning and supervised learning in which a cost value acquired by an A* search algorithm is a supervisor.
(12)
   The information processing device according to any one of (1) to (11), wherein
   the convolutional neural network is a fully convolutional network.
(13)
   The information processing device according to any one of (1) to (12), wherein
   the convolutional neural network includes an encoder and a decoder.
(14)
   An information processing device comprising:
   a search unit configured to perform path searching, based on a learned heuristics function, wherein
   the search unit performs the path searching, based on the heuristics function expressed as a two or more dimensional image, acquired by learning based on a plurality of obstacle maps.
(15)
   An information processing method comprising:
   learning a heuristics function according to path searching, by a processor, with a convolutional neural network, wherein
   the convolutional neural network carries out learning based on a plurality of obstacle maps, to output a heuristics map expressing the heuristics function as a two or more dimensional image.
(16)
   An information processing method comprising:
   performing path searching, based on a learned heuristics function, by a processor, wherein
   the performing the path searching further includes performing path searching based on the heuristics function expressed as a two or more dimensional image, acquired by learning based on a plurality of obstacle maps.

REFERENCE SIGNS LIST

10 Learning device
110 Input unit
120 Learning unit
130 Storage unit
140 Display unit
20 Search device
210 Input unit
220 Sensor unit
230 Search unit
240 Storage unit
250 Control unit

The invention claimed is:
1. An information processing device, comprising:
   a display device; and
   at least one processor configured to:
      input a feature map to a convolutional neural network;
      learn a heuristics function based on a path searching operation, with the convolutional neural network to output a heuristics map, wherein
         the convolutional neural network carries out the learning of the heuristics function based on the feature map,
         the convolutional neural network is a fully convolutional neural network,
         the fully convolutional neural network simultaneously predicts heuristics values based on all nodes of the heuristics map,
         the learned heuristics function is associated with the predicted heuristics values,
         the feature map is extracted based on a plurality of multi-dimensional obstacle maps,
         the feature map includes obstacle information and path information,
         each of the obstacle information and the path information is in a multi-dimensional map, and the convolutional neural network outputs the heuristics map that expresses the learned heuristics function as a multi-dimensional image;
control the display device to display the heuristics map; and
control movement of a vehicle based on a result of the path searching operation.

2. The information processing device according to claim 1, wherein the path information includes at least information according to cost to a goal point.

3. The information processing device according to claim 2, wherein the cost to the goal point is distance to the goal point.

4. The information processing device according to claim 1, wherein the obstacle information includes at least information according to a distance from an obstacle.

5. The information processing device according to claim 1, wherein
the convolutional neural network carries out the learning based on a learning algorithm, and
the learning algorithm is target learning with a backward Dijkstra's algorithm.

6. The information processing device according to claim 1, wherein
the convolutional neural network carries out the learning based on a learning algorithm, and
the learning algorithm is target learning with an A* search algorithm.

7. The information processing device according to claim 1, wherein
the convolutional neural network carries out the learning based on a learning algorithm, and
the learning algorithm is target learning with temporal difference (TD) error minimization.

8. The information processing device according to claim 7, wherein
the target learning with the TD error minimization includes a combination of TD learning and supervised learning, and
in the supervised learning, a cost value acquired by an A* search algorithm is a supervisor.

9. The information processing device according to claim 1, wherein the convolutional neural network includes an encoder and a decoder.

10. An information processing device, comprising:
a plurality of sensors configured to:
acquire a variation in a state of a first obstacle of a plurality of obstacles;
acquire a variation in a state of a second obstacle of the plurality of obstacles, wherein the plurality of obstacles is along a moving path of a vehicle; and
at least one processor configured to:
receive a heuristics map, wherein
the heuristics map expresses a learned heuristics function as a multi-dimensional image,
the learned heuristics function is acquired by learning, with a convolutional neural network, based on a plurality of multi-dimensional obstacle maps,
the convolutional neural network is a fully convolutional neural network,
the fully convolutional neural network simultaneously predicts heuristics values based on all nodes of the heuristics map, and
the learned heuristics function is associated with the predicted heuristics values,
perform a first path searching operation based on the learned heuristics function and the variation in the state of the first obstacle;
perform a second path searching operation based on the first path searching operation and the variation in the state of the second obstacle; and
control movement of the vehicle based on a result of the second path searching operation.

11. An information processing method, comprising:
inputting, by a processor, a feature map to a convolutional neural network;
learning a heuristics function based on a path searching operation, by the processor, with the convolutional neural network to output a heuristics map, wherein
the convolutional neural network carries out the learning of the heuristics function based on the feature map,
the convolutional neural network is a fully convolutional neural network,
the fully convolutional neural network simultaneously predicts heuristics values based on all nodes of the heuristics map,
the learned heuristics function is associated with the predicted heuristics values,
the feature map is extracted based on a plurality of multi-dimensional obstacle maps,
the feature map includes obstacle information and path information,
each of the obstacle information and the path information is in a multi-dimensional map, and
the convolutional neural network outputs the heuristics map that expresses the learned heuristics function as a multi-dimensional image;
controlling, by the processor, a display device to display the heuristics map; and
controlling, by the processor, movement of a vehicle based on a result of the path searching operation.

12. An information processing method, comprising:
acquiring, by a plurality of sensors, a variation in a state of a first obstacle of a plurality of obstacles;
acquiring, by the plurality of sensors, a variation in a state of a second obstacle of the plurality of obstacles, wherein the plurality of obstacles is along a moving path of a vehicle;
receiving, by a processor, a heuristics map, wherein
the heuristics map expresses a learned heuristics function as a multi-dimensional image,
the learned heuristics function is acquired by learning, with a convolutional neural network, based on a plurality of multi-dimensional obstacle maps,
the convolutional neural network is a fully convolutional neural network,
the fully convolutional neural network simultaneously predicts heuristics values based on all nodes of the heuristics map, and
the learned heuristics function is associated with the predicted heuristics values;
performing, by the processor, a first path searching operation based on the learned heuristics function and the variation in the state of the first obstacle;
performing, by the processor, a second path searching operation based on the first path searching operation and the variation in the state of the second obstacle; and
controlling, by the processor, movement of the vehicle based on a result of the second path searching operation.

* * * * *